(12) United States Patent
Xi et al.

(10) Patent No.: US 10,297,811 B2
(45) Date of Patent: May 21, 2019

(54) FUEL CELL STACK

(71) Applicant: GM GLOBAL TECHNOLOGY OPERATIONS LLC, Detroit, MI (US)

(72) Inventors: Liang Xi, Northville, MI (US); Xi Yang, Bloomfield Hills, MI (US); Siguang Xu, Rochester Hills, MI (US); Glenn W Skala, Churchville, NY (US); Richard Blakeley, Ortonville, MI (US); Ronald R Stevens, Honeye Falls, NY (US)

(73) Assignee: GM Global Technology Operations LLC., Detroit, MI (US)

( * ) Notice: Subject to any disclaimer, the term of this patent is extended or adjusted under 35 U.S.C. 154(b) by 60 days.

(21) Appl. No.: 15/711,137

(22) Filed: Sep. 21, 2017

(65) Prior Publication Data

US 2019/0088919 A1    Mar. 21, 2019

(51) Int. Cl.
| | |
|---|---|
| *H01M 8/0271* | (2016.01) |
| *H01M 8/0297* | (2016.01) |
| *H01M 4/86* | (2006.01) |
| *H01M 8/0276* | (2016.01) |
| *H01M 2/26* | (2006.01) |
| *H01M 8/0221* | (2016.01) |
| *C08L 21/00* | (2006.01) |
| *H01M 8/124* | (2016.01) |
| *H01M 4/02* | (2006.01) |

(52) U.S. Cl.
CPC ......... *H01M 2/263* (2013.01); *H01M 4/8657* (2013.01); *H01M 8/0221* (2013.01); *H01M 8/0271* (2013.01); *H01M 8/0276* (2013.01); *H01M 8/0297* (2013.01); *C08L 21/00* (2013.01); *H01M 2004/029* (2013.01); *H01M 2008/1293* (2013.01)

(58) Field of Classification Search
CPC ............. H01M 8/0271; H01M 8/0273; H01M 8/0276; H01M 8/0247; H01M 8/0297
See application file for complete search history.

(56) References Cited

U.S. PATENT DOCUMENTS

| | | | |
|---|---|---|---|
| 8,227,145 B2 | 7/2012 | Keyser et al. | |
| 8,371,587 B2 | 2/2013 | Fly et al. | |
| 8,609,298 B2* | 12/2013 | Skala | H01M 8/0271 429/508 |
| 2013/0045434 A1* | 2/2013 | Skala | H01M 8/0271 429/465 |
| 2014/0065509 A1* | 3/2014 | Skala | H01M 8/0276 429/460 |
| 2017/0084929 A1* | 3/2017 | Xu | H01M 8/0282 |
| 2018/0226661 A1* | 8/2018 | Yang | H01M 8/0271 |
| 2018/0287181 A1* | 10/2018 | Rock | H01M 8/2404 |

\* cited by examiner

*Primary Examiner* — Stewart A Fraser
(74) *Attorney, Agent, or Firm* — Quinn IP Law (57) ABSTRACT

The present disclosure provides a fuel cell stack having a plurality of bipolar plates aligned in a stack between a pair of bipolar plates wherein each of the bipolar plates includes an outer bead having an interior cavity; and an inner bead having a trough wherein the inner bead extends into the interior cavity of the outer bead. The trough of the inner bead may be at least about 50% filled with an elastomeric seal.

22 Claims, 9 Drawing Sheets

FUEL CELL STACK

TECHNICAL FIELD

The invention relates to a fuel cell system and more particularly to an improved fuel cell stack having a robust bead structure for sealing between the plates of the fuel cell stack.

BACKGROUND

Fuel cell systems are increasingly being used as a power source in a wide variety of applications. Fuel cell systems have been proposed for use in power consumers such as vehicles as a replacement for internal combustion engines, for example. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA are pressed between a pair of electronically conductive plates which serve as secondary current collectors for collecting the current from the primary current collectors. The plates conduct current between adjacent cells internally of the stack in the case of bipolar plates and conduct current externally of the stack (in the case of monopolar plates at the end of the stack).

The bipolar plates typically include two thin, facing metal sheets. One of the sheets defines a flow path on one outer surface thereof for delivery of the fuel to the anode of the MEA. An outer surface of the other sheet defines a flow path for the oxidant for delivery to the cathode side of the MEA. When the sheets are joined, the joined surfaces define a flow path for a dielectric cooling fluid. The plates are typically produced from a formable metal that provides suitable strength, electrical conductivity, and corrosion resistance, such as 316L alloy stainless steel for example.

The stack, which can contain more than one hundred plates, is compressed, and the elements held together by bolts through corners of the stack and anchored to frames at the ends of the stack. In order to militate against undesirable leakage of fluids from between the pairs of plates, a seal is often used. The seal is disposed along a peripheral edge of the pairs of plates. Prior art seals have included the use of an elastomeric material in conjunction with a bead stamped into the bipolar plate.

It would be desirable to produce a metal bead seal for sealing between plates of a fuel cell system, wherein the bead structure militates against a leakage of fluids from the fuel cell system and a cost thereof is minimized.

SUMMARY

In one embodiment of the present disclosure, a fuel cell stack is provided wherein the fuel cell stack includes a plurality of bipolar plates aligned in a stack between a pair of bipolar plates wherein each of the bipolar plates includes an outer bead having an interior cavity; and an inner bead having a trough wherein the inner bead extends into the interior cavity of the outer bead. The trough of the inner bead is at least about 50% filled with an elastomeric seal.

In yet another embodiment of the present disclosure, a bipolar plate for a fuel cell stack is provided where the bipolar plate includes a first shell affixed to a second shell wherein the first and second shell define a plurality of channels therebetween. An outer bead may be defined in the first shell proximate to the perimeter of the first shell. The outer bead further includes an interior cavity. An inner bead may be defined in the second shell proximate to the perimeter of the second shell. The inner bead may further include a trough. The inner bead of the second shell mates with the outer bead of the first shell by extending into the interior cavity of the outer bead. The trough of the inner bead may be at least 30% filled with an elastomeric seal.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 1:
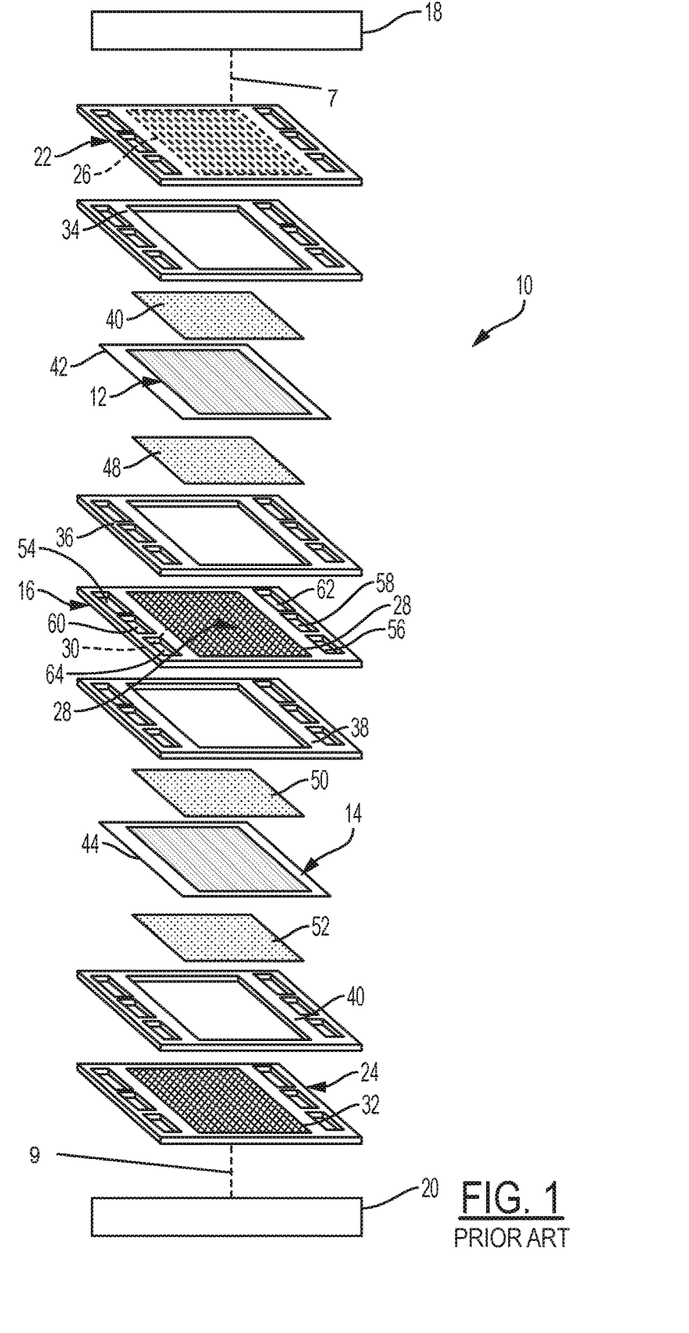
FIG. 1 is an expanded view of a traditional fuel cell stack.

FIG. 1 shows an illustrative bipolar PEM fuel cell stack 10 known in the art. For simplicity, two-cells in the stack (i.e. three bipolar plates) are detailed in FIG. 1, it being understood that a typical stack will have many more such cells and bipolar plates (for example, as further shown in FIG. 3). Although a bipolar PEM fuel cell stack is shown, it is understood that other fuel cell types and configurations may also be used without departing from the scope and spirit of the disclosure. It is further understood that elements 7 and 9 represent additional fuel cells within the fuel cell stack 10.

The illustrative fuel cell stack 10 includes a first MEA 12 and a second MEA 14, each having an electrolyte membrane disposed between an anode electrode and a cathode electrode. An electrically conductive bipolar plate 16 is disposed between the first MEA 12 and the second MEA 14. The first MEA 12, the second MEA 14, and the bipolar plate 16 are stacked together between bipolar plates 22, 24 within the fuel cell stack 10. The clamping plates 18, 20 are electrically insulated from the bipolar plates in the stack.

A working face of each of the bipolar plates 22, 24, as well as both working faces of the bipolar plate 16 include a respective flow field 26, 32, 28, 30 formed therein having a plurality of flow channels. The flow fields 26, 28, 30, 32 distribute reactants such as hydrogen and oxygen/air over the faces of the MEAs 12, 14.

Nonconductive gaskets 34, 36, 38, 40 may be respectively disposed between the bipolar plate 22 and the first MEA 12, the first MEA 12 and the bipolar plate 16, the bipolar plate 16 and the second MEA 14, and the second MEA 14 and the bipolar plate 24. The gaskets 34, 36, 38, 40 facilitate a seal and electrically insulate the end plate 22 and the first MEA 12, the first MEA 12 and the bipolar plate 16, the bipolar plate 16 and the second MEA 14, and the second MEA 14 and the bipolar plate 24.

The MEAs 12, 14 of the illustrative fuel cell stack 10 may have nonconductive subgaskets or barrier films 42, 44. The subgaskets 42, 44, either alone or employed in conjunction with the gaskets 34, 36, 38, 40, extend from the edges of the electrodes and facilitate a seal of the first MEA 12 and the bipolar plate 16 and the bipolar plate 16 and the second MEA 14. The subgaskets 42, 44 also electrically insulate the first MEA 12 and the bipolar plate 16, and the bipolar plate 16 and the second MEA 14. As a nonlimiting example, the subgaskets 42, 44 may be formed respectively integral with the nonconductive gaskets 34, 36, 38, 40. The subgaskets 42, 44 may also be formed integrally with the electrolyte membrane. In other embodiments, the subgaskets 42, 44 are formed from another suitable, electrically nonconductive material and coupled to the MEAs 12, 14, respectively. Collectively, the MEAs 12, 14, the gaskets 34, 36, 38, 40, and the subgaskets 42, 44 are known as fuel cell "softgoods" or "softgood layers."

Gas-permeable DM 46, 48, 50, 52 abut respective electrodes of the first MEA 12 and the second MEA 14. The DM 46, 48, 50, 52 are respectively disposed between the end plate 22 and the first MEA 12, the first MEA 12 and the bipolar plate 16, the bipolar plate 16 and the second MEA 14, and the second MEA 14 and the bipolar plate 24.

The bipolar plates 16, 22, 24, and the gaskets 34, 36, 38, 40 each include a cathode supply aperture 54 and a cathode exhaust aperture 56, a coolant supply aperture 58 and a coolant exhaust aperture 60, and an anode supply aperture 62 and an anode exhaust aperture 64. Supply manifolds and exhaust manifolds of the fuel cell stack 10 are formed by an alignment of the respective apertures 54, 56, 58, 60, 62, 64 in the bipolar plates 16, 22, 24, and the gaskets 34, 36, 38, 40. The hydrogen gas is supplied to an anode supply manifold via an anode inlet conduit 66. The air is supplied to a cathode supply manifold of the fuel cell stack 10 via a cathode inlet conduit (not shown) at end plate 18. An anode outlet conduit and a cathode outlet conduit are also provided for an anode exhaust manifold and a cathode exhaust manifold, respectively. A coolant inlet conduit (not shown) is also provided at end plate 18 for supplying liquid coolant to a coolant supply manifold. A coolant outlet conduit (not shown) may also be provided at end plate 18 for removing coolant from a coolant exhaust manifold.

Figure 2:
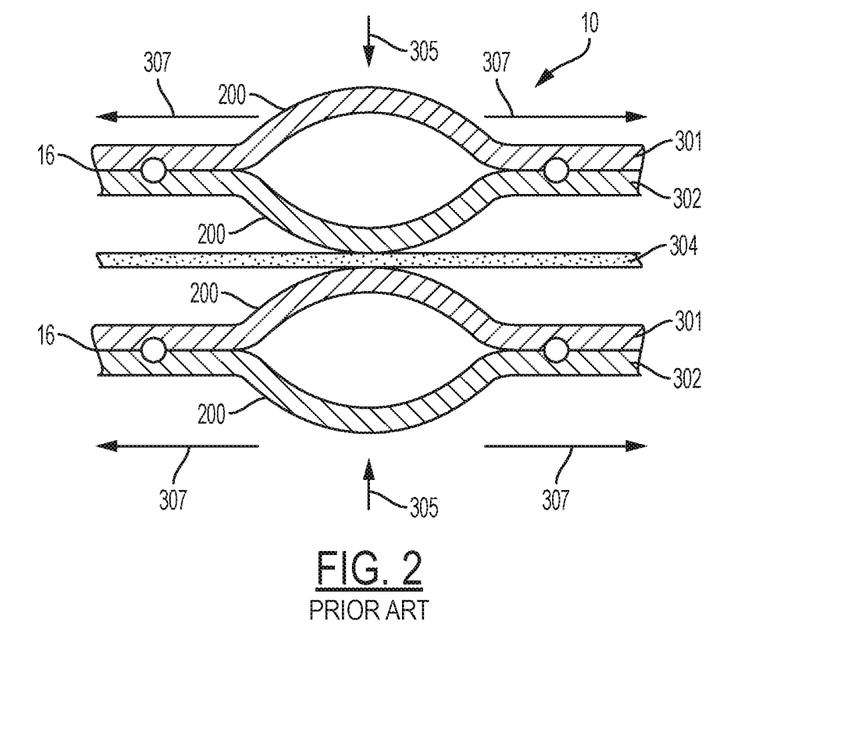
FIG. 2 is a cross sectional view of a metal bead seal in a traditional fuel cell used in the fuel cell stack of FIG. 1 prior to the application of a compression force.

With reference to FIG. 2, each of the pair of traditional bipolar plates 16, 22, 24 is formed from a first unipolar plate 301 and a second unipolar plate 302. The first unipolar plate 301 is bonded to the second unipolar plate 302. The bonded first and second unipolar plates 301, 302 form internal channels (not shown) adjacent the flowfield 28, 30 (FIG. 1) of each of the pair of bipolar plates 16 for coolant to flow therethrough for temperature regulation of the illustrative fuel cell stack 10. The first and second unipolar plates 301, 302 may be bonded by at least one of a variety of suitable means known in the art, such as by welding or by an application of an adhesive, for example. Other suitable means for bonding the first unipolar plate 301 with the second unipolar plate 302 may be selected as desired.

The bipolar plates 16, 22, 24 of the traditional fuel cell stack 10 have a softer layer 304 such as at least one of the gaskets 34, 36, 38, 40 and the subgaskets 42, 44, for example, disposed between each bipolar plate 16, 22, 24. The single bead 200 is formed on each of the pair of bipolar plates 16, 22, 24. The single bead 200 has a substantially arcuate surface as shown in FIG. 2. As a non-limiting example, the single bead 200 may be formed by a stamping operation performed on the first and second plates 301, 302. The single beads 200 of each of the pair of bipolar plates 16 sandwich the softer layer 304 when the fuel cell stack 10 is placed in the compressed state. In the compressed state, contact between the single beads 200 results.

However, as compression loads 305 (FIG. 2) are applied to the single beads of the fuel cell, the beads have a tendency to flatten given both the top and bottom plates move laterally along the lateral direction 307 as shown in FIG. 2 as the bead absorbs energy from the compression loads 305. The flattening deformation in the traditional bead of FIG. 2 may therefore compromise the fluid tight seal between two bipolar plates.

Figure 3:
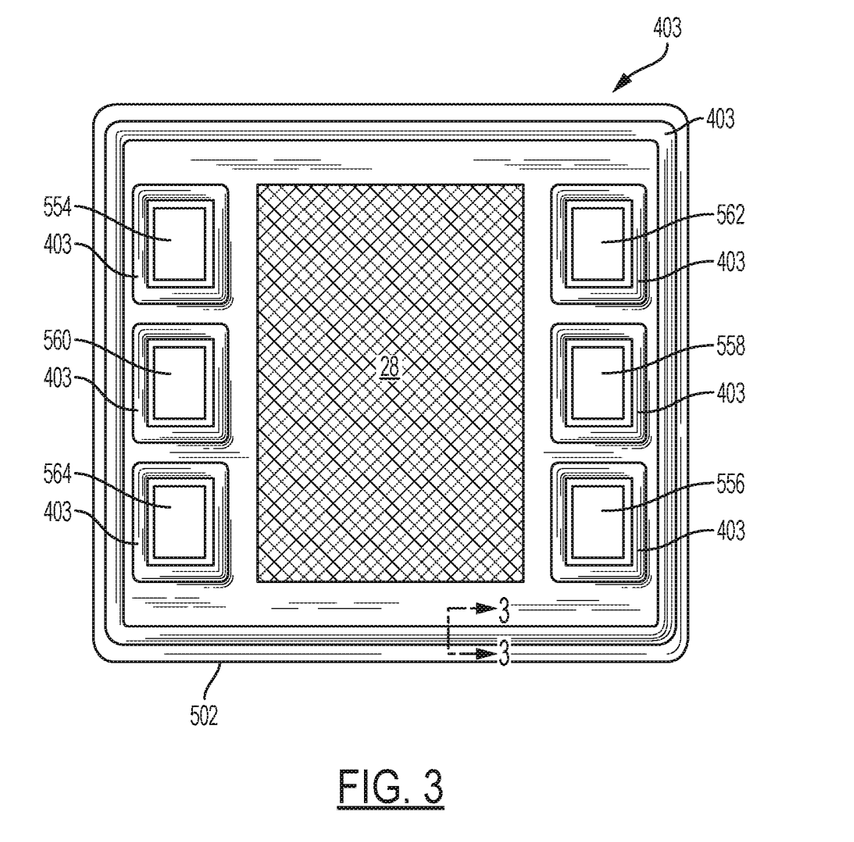
FIG. 3 is a plan view of an example, non-limiting bipolar plate according to various embodiments of the present disclosure.

The present disclosure therefore provides a fuel cell stack 400 (FIG. 5A) having a plurality 407 of fuel cells 405 having bipolar plates 404 (FIGS. 4A-4B) disposed between a pair of end plates 402, 403. Each of the bipolar plate 404 includes an outer bead 406 having an interior cavity 408 and an inner bead 410 having a trough 412. An example bipolar plate 404 of the present disclosure is shown in FIG. 3 in further detail. The bipolar plate 404 includes a metal bead seal 403 formed thereon. The metal bead seal 403 is typically formed on the bipolar plate 404 16 adjacent or proximate to the peripheral or outer edge 502 (FIG. 3) thereof. The metal bead seal 403 may also be disposed adjacent to a peripheral edge 502 of the bipolar plate 404 404 and surround at least one of the apertures 554, 556, 558, 560, 562, 564. As indicated, the metal bead seal 403 of the present disclosure includes an inner bead 410 and an outer bead 406 as further described herein.

Figure 4A:
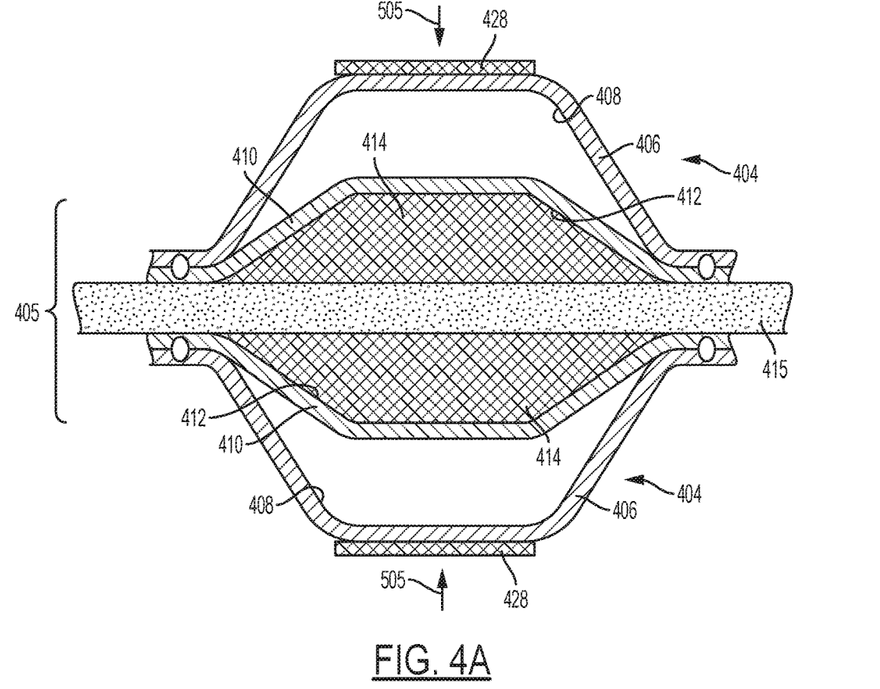
FIG. 4A is a cross sectional view of a first example, non-limiting fuel cell according to the present disclosure.
Figure 4B:
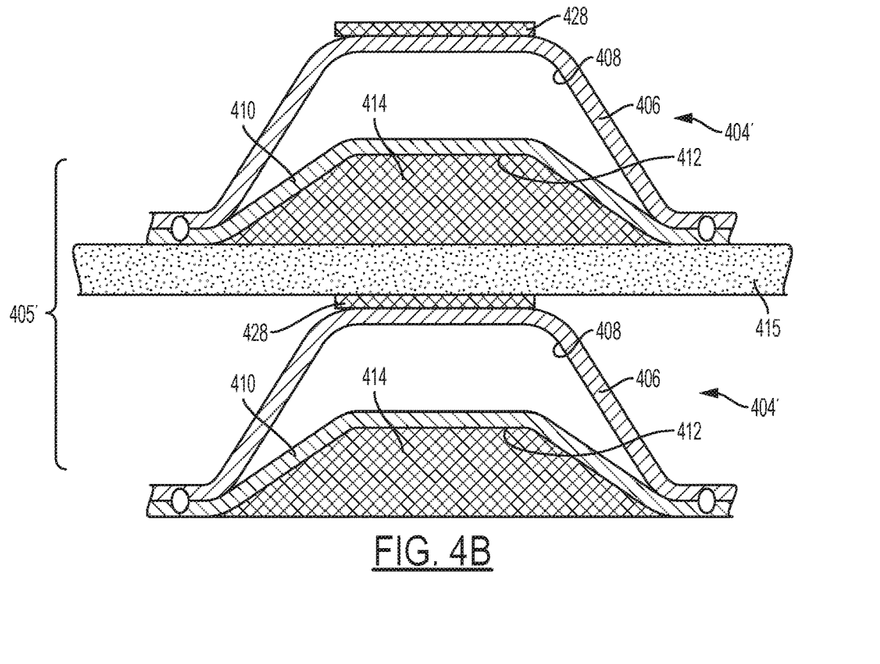
FIG. 4B is across sectional view of a second example, non-limiting fuel cell according to the present disclosure.
Figure 5A:
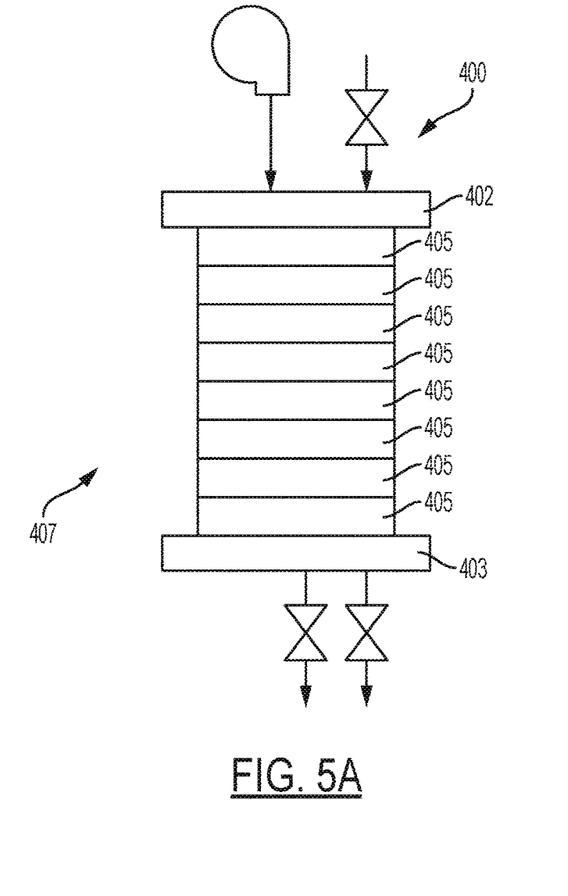
FIG. 5A is a schematic side view of an example fuel cell stack of the present disclosure.

With reference to FIG. 4A, an example metal bead seal 403 is shown having the inner bead 410 and the outer bead 406. The inner bead 410 extends into the interior cavity 408 of the outer bead 406. The trough 412 of the inner bead 410 is at least about 50% filled with an elastomeric seal 414. The elastomeric seal 414 may fill the trough 412 from at least 30% to about 150% such that the elastomeric seal 414 extends above and/or beyond the lateral edge 421 of the trough 412. The elastomeric seal 414 may, but not necessarily, be formed from any one or more of EPDM (Ethylene propylene diene monomer), HNBR (Hydrogenated acrylonitrile-butadiene), NBR (acrylonitrile butadiene), VMQ (silicone), FVMQ (fluorosilicone), and FKM (fluoropolymer). Accordingly, the fuel cell stack 400 of the present disclosure provides for a robust design such that the metal bead seal 403 between each bipolar plate 404 maintains uniform contact between each other despite significant compression loads 505 (FIG. 4A).

Figure 6A:
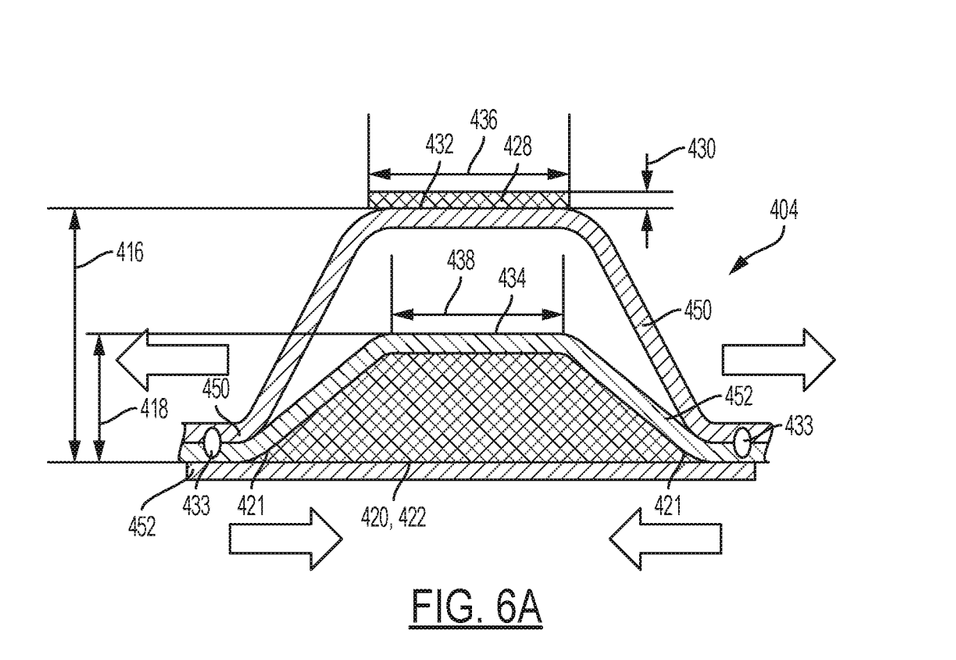
FIG. 6A is a cross-sectional view of an example metal bead seal having a flat engagement surface according to the present disclosure.

As shown in FIG. 6A, the outer bead 406 includes an outer bead height 416 which may, but not necessarily, fall in the range of about 0.3 mm to about 1.0 mm. The inner bead 410 extends into the interior cavity 408 as shown in FIG. 6A with an inner bead height 418 which may, but not necessarily, fall in a range from about 10% of the outer bead height 416 to about 100% of the outer bead height 416—as low as 0.003 mm to as high as 1.0 mm. As indicated, the inner bead 410 includes a trough 412 which may be at least 50% filled with an elastomeric seal 414. The elastomeric seal 414 may extend above and beyond the lateral edge(s) 421 (FIG. 6C) of the inner bead 410. Moreover, the elastomeric seal 414 may defines an engagement surface 420 having one of a flat configuration 422 (FIG. 6A), substantially concave configuration 424 (FIG. 6B), or a substantially convex configuration 426 (FIG. 6C).

Figure 6B:
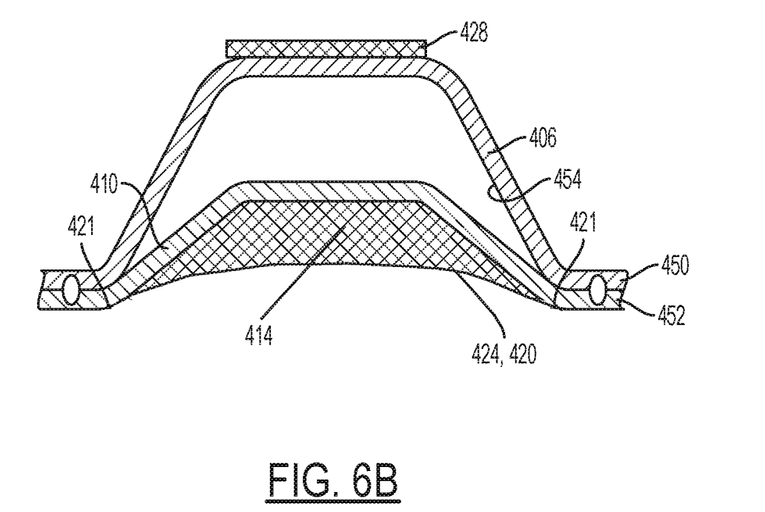
FIG. 6B is a cross-sectional view of an example metal bead seal having a concave engagement surface according to the present disclosure.
Figure 6C:
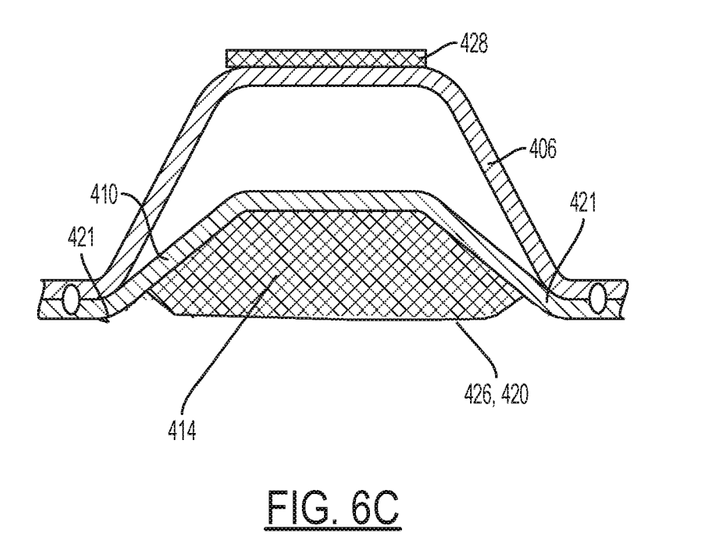
FIG. 6C is a cross-sectional view of an example metal bead seal having a convex engagement surface according to the present disclosure.

With reference to FIGS. 6A-6C, the outer bead 406 may include an outer elastomer 428 having an outer elastomer thickness 430 which falls in the range of about 30 microns to about 300 microns. The outer elastomer 428 may be disposed on a planar outer bead surface 432 as shown. Similar to the outer bead 406, the inner bead 410 defines a planar inner bead surface 434. The width 438 of the planar inner bead surface 434 may be equal, less than, or greater than the width of the planar outer bead surface 432. In the example shown in FIG. 6A, the width 436 of the planar outer bead surface 432 is greater than the width 438 of the planar inner bead surface 434. The change in relative widths enables a change in performance (rate of energy absorption) when a compression load 505 is applied to the metal bead seal 403. Therefore, this arrangement can be fine-tuned and varied according to the needs or use of the fuel stack 400 such as high compression load environment or lower compression load environment.

Figure 5B:
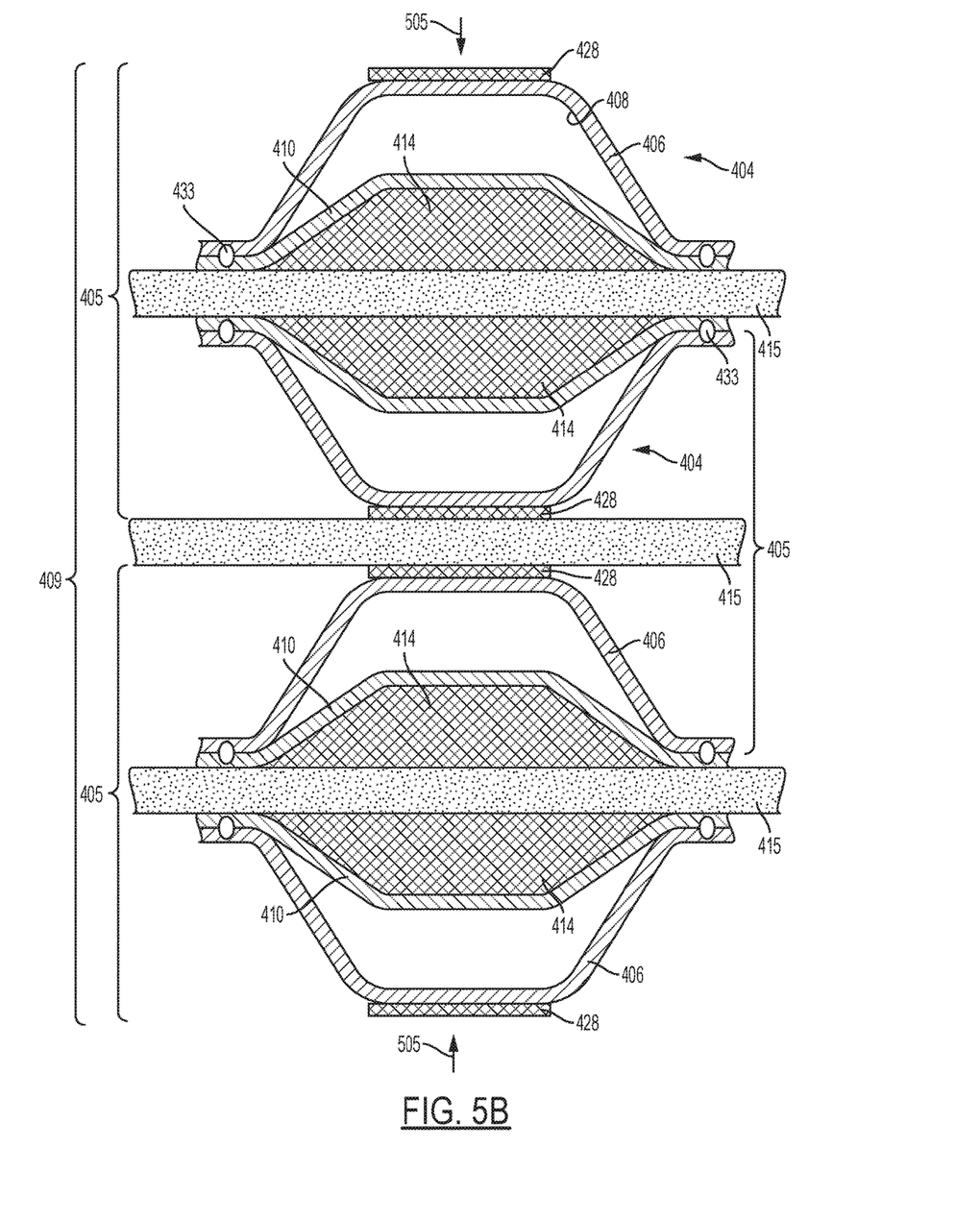
FIG. 5B is an enlarged view of example, non-limiting fuel cells stacked within the fuel cell stack of FIG. 5A.
Figure 5C:
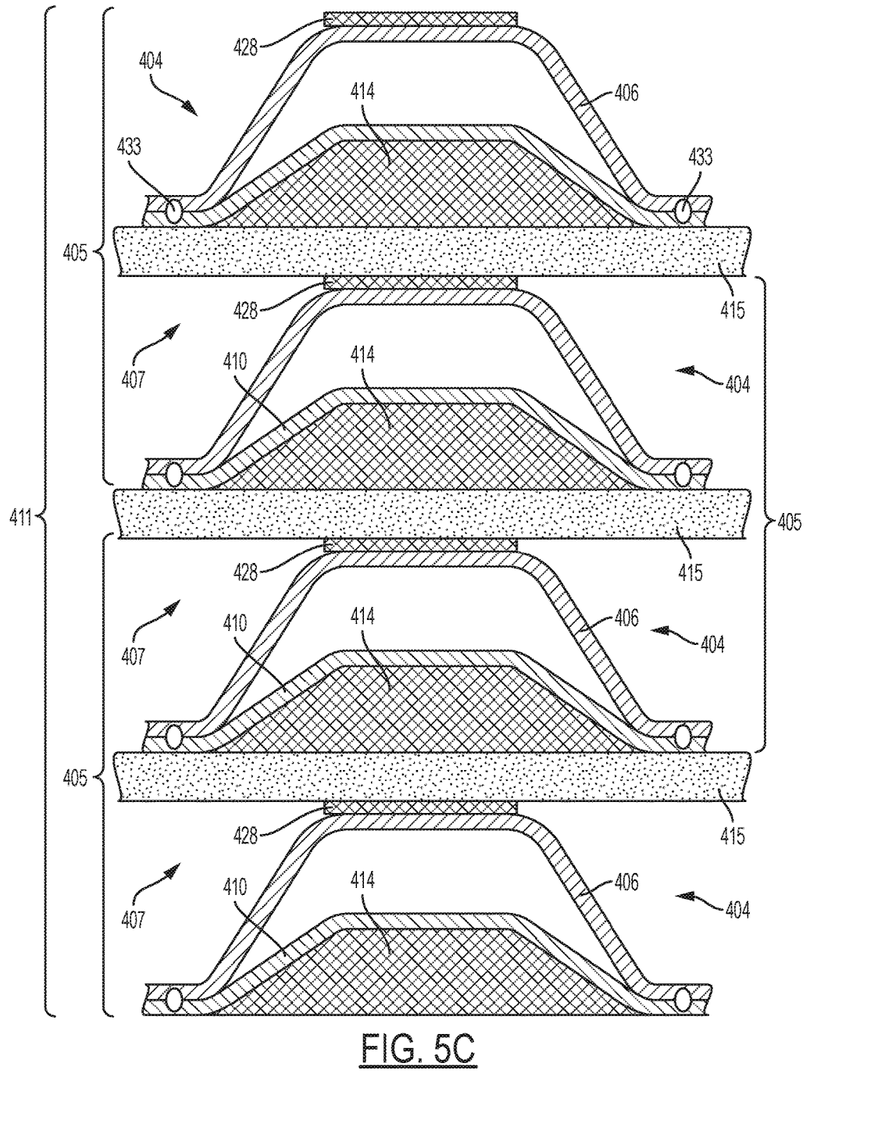
FIG. 5C is another enlarged view of different example, non-limiting fuel cells stacked within the fuel cell stack of FIG. 5A.

The plurality of bipolar plates 404 in the fuel cell stack 400 may be configured such that the outer elastomer 428 of the outer bead 406 of one of the bipolar plate 404 is received in and interlocks with the elastomeric seal 414 disposed in the trough 412 of another (adjacent) bipolar plate 404 with a subgasket 415 therebetween as shown in joint 407 of FIG. 5C. It is understood that FIG. 5C shows two example fuel cells adjacent to one another where the bipolar plate 404 are arranged in a "stacked configuration" throughout the fuel cell stack 400. That is, the arrangement of the stacked bipolar plates 404 shown in FIG. 5C is carried throughout the fuel cell stack 400.

Alternatively, as shown in FIG. 5B, the plurality of bipolar plates 404 in the fuel cell stack 400 may be configured such that the outer elastomer 428 of one of the bipolar plates 404 engages with the outer elastomer 428 of another adjacent bipolar plate 404. Again, it is understood that FIG. 5C is yet another example which shows three fuel cells 405 adjacent to one another where the bipolar plates 404 are arranged in a "mirrored configuration" 409 throughout the fuel cell stack 400.

In yet another embodiment of the present disclosure as shown in FIGS. 3 and 6A, a bipolar plate 404 for a fuel cell stack 400 (FIG. 5A) is provided where the bipolar plate 404 includes a first shell 450 affixed to a second shell 452 wherein the first and second shell 450, 452 define at least one channel 454 therebetween. It is understood, throughout the present disclosure, that the first shell may be affixed to the second shell via a variety of means which may or may not include the use of a weld 433 (FIG. 6A). An outer bead 406 may be defined in the first shell 450 proximate to the perimeter 502 (FIG. 3) of the first shell 450. The outer bead 406 further includes an interior cavity 408. An inner bead 410 may be defined in the second shell 452 proximate to the perimeter of the second shell 452. The inner bead 410 may further include a trough 412. The inner bead 410 of the second shell 452 mates with the outer bead 406 of the first shell 450 by extending into the interior cavity 408 of the outer bead 406. The trough 412 of the inner bead 410 may be at least 50% filled with an elastomeric seal 414. The elastomeric seal 414 may, but not necessarily, be formed from any one or more of EPDM, HNBR, NBR, VMQ, FVMQ, and FKM.

As shown in FIG. 6A, the outer bead 406 may, but not necessarily, include an outer bead height 416 which falls in the range of about 0.3 mm to 1.0 mm. The inner bead 410 may have an inner bead height 418 which falls in a range from about 10% of the outer bead height 416 to about 100% of the outer bead height 416. With further reference to FIG. 6C, the elastomeric seal 414 may fill about 150% of the trough 412 of the inner bead 410 such that the elastomeric seal 414 extends above and beyond each lateral edge 421 of the trough 412. As shown in FIGS. 6A-6C, the elastomeric seal 414 may define an engagement surface 420 which may, but not necessarily have either a substantially flat configuration 422, substantially concave configuration 424, or a substantially convex configuration 426. It is further understood that the bipolar plate 404 of the present disclosure may include an outer elastomer 428 disposed on the outer planar surface 432 where the outer elastomer 428 has an outer elastomer thickness 430 which falls in the range of about 30 microns to about 300 microns. The outer bead 406 define a planar outer bead surface 432, and the inner bead 410 define a planar inner bead surface 434.

The plurality of bipolar plates 404 in the fuel cell stack 400 (FIG. 5A) may be configured such that the outer elastomer 428 of the outer bead 406 of one of the bipolar plate 404 is received in and interlocks with the elastomeric seal 414 disposed in the trough 412 of another (adjacent) bipolar plate 404 with a subgasket 415 disposed there between as shown in joint 407 of FIG. 5C. It is understood that FIG. 5C shows three example fuel cells adjacent to one another where the bipolar plates 404 are arranged in a "stacked configuration" throughout the fuel cell stack 400.

Alternatively, as shown in FIG. 5B, the bipolar plate 404 in the fuel cell stack 400 may be configured such that the outer elastomer 428 of the bipolar plate 404 engages with the outer elastomer 428 of another adjacent bipolar plate 404 with a subgasket 415 disposed there between. Again, it is understood that FIG. 5C is yet another example which shows three fuel cells 405 adjacent to one another where the bipolar plates 404 are arranged in a "mirrored configuration" 411 throughout the fuel cell stack 400.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fuel cell stack comprising:
   a plurality of bipolar plates aligned between a pair of end plates, each of the bipolar plates further including
   an outer bead having an interior cavity; and
   an inner bead having a trough wherein the inner bead extends into the interior cavity of the outer bead and the trough of the inner bead is at least about 30% filled with an elastomeric seal.

2. The fuel cell stack as defined in claim 1 wherein the elastomeric seal may be formed from any one or more of EPDM, HNBR, NBR, VMQ, FVMQ, and FKM.

3. The fuel cell stack as defined in claim 1 wherein the outer bead includes an outer bead height which falls in a first range of about 0.3 mm to 1.0 mm.

4. The fuel cell stack as defined in claim 3 wherein the inner bead may have an inner bead height which falls in a second range from about 10% of the outer bead height to about 100% of the outer bead height.

5. The fuel cell stack as defined in claim 4 wherein the elastomeric seal fills about 150% of the trough of the inner bead.

6. The fuel cell stack as defined in claim 5 wherein the elastomeric seal defines an engagement surface having one of a flat configuration, substantially concave configuration, or a substantially convex configuration.

7. The fuel cell stack as defined in claim 6 wherein the outer bead includes an outer elastomer having an outer elastomer thickness which falls in a third range of about 30 microns to about 300 microns.

8. The fuel cell stack as defined in claim 7 wherein the outer bead defines a planar outer bead surface, and the inner bead defines a planar inner bead surface.

9. The fuel cell stack as defined in claim 8 wherein a width of the planar outer bead surface is greater than that of the planar inner bead surface.

10. The fuel cell stack as defined in claim 7 wherein an outer elastomer of the outer bead of one of the bipolar plates is received in and interlocks with the elastomeric seal disposed in the trough of another bipolar plate.

11. The fuel cell stack as defined in claim 7 wherein the elastomeric seal of one of the bipolar plates engages with the elastomeric seal of another bipolar plate.

12. A bipolar plate comprising:
   a first shell affixed to a second shell, the first and second shell defining a plurality of channels therebetween;
   an outer bead defined in the first shell proximate to a perimeter of the first shell, the outer bead having an interior cavity; and
   an inner bead defined in the second shell proximate to another perimeter of the second shell, the inner bead having a trough,
   wherein the inner bead mates with the outer bead by extending into the interior cavity of the outer bead and the trough of the inner bead is at least 50% filled with an elastomeric seal.

13. The bipolar plate as defined in claim 12 wherein elastomeric seal may be formed from any one or more of EPDM, HNBR, NBR, VMQ, FVMQ, and FKM.

14. The bipolar plate as defined in claim 12 wherein the outer bead includes an outer bead height which falls in a first range of about 0.3 mm to 1.0 mm.

15. The bipolar plate as defined in claim 14 wherein the inner bead may have an inner bead height which falls in a second range from about 10% of the outer bead height to about 100% of the outer bead height.

16. The bipolar plate as defined in claim 15 wherein the elastomeric seal extends beyond a lateral edge of the trough of the inner bead.

17. The bipolar plate as defined in claim 16 wherein the elastomeric seal defines an engagement surface having one of a flat configuration, substantially concave configuration, or a substantially convex configuration.

18. The bipolar plate as defined in claim 17 wherein the outer bead includes an outer elastomer having an outer elastomer thickness which falls in a third range of about 30 microns to about 300 microns.

19. The bipolar plate as defined in claim 18 wherein the outer bead defines a planar outer bead surface, and the inner bead defines a planar inner bead surface.

20. The bipolar plate as defined in claim 19 wherein a width of the planar outer bead surface is greater than that of the planar inner bead surface.

21. The bipolar plate as defined in claim 18 wherein an outer elastomer of the outer bead is configured to engage with an elastomeric seal of an adjacent bipolar plate.

22. The bipolar plate as defined in claim 18 wherein the elastomeric seal of the inner bead is configured to engage with another elastomeric seal of another bipolar plate.

* * * * *